United States Patent
Zhang et al.

(10) Patent No.: US 7,502,186 B2
(45) Date of Patent: Mar. 10, 2009

(54) DISK DRIVE CLOCK TRACKING CIRCUIT, ERROR COMPENSATION CIRCUIT AND METHOD

(75) Inventors: Jingliang Zhang, Singapore (SG); Branislav Hredzak, Singapore (SG); Qing Li, Shanghai (CN); Guoxiao Guo, Singapore (SG)

(73) Assignee: Agency for Science Technology and Research, Centros (SI)

( * ) Notice: Subject to any disclaimer, the term of this patent is extended or adjusted under 35 U.S.C. 154(b) by 125 days.

(21) Appl. No.: 11/278,308

(22) Filed: Mar. 31, 2006

(65) Prior Publication Data
US 2006/0250723 A1 Nov. 9, 2006

Related U.S. Application Data (60) Provisional application No. 60/667,081, filed on Apr. 1, 2005.

(51) Int. Cl.
*G11B 5/09* (2006.01)
(52) U.S. Cl. ............... 360/51; 360/29; 360/53
(58) Field of Classification Search .......... None
See application file for complete search history.

(56) References Cited

U.S. PATENT DOCUMENTS

| | | | |
|---|---|---|---|
| 5,615,191 A * | 3/1997 | Takeda et al. | 360/51 |
| 5,790,332 A * | 8/1998 | Bucska | 360/51 |
| 5,796,541 A * | 8/1998 | Stein et al. | 360/75 |
| 5,995,318 A | 11/1999 | Hasegawa et al. | |
| 6,172,830 B1 * | 1/2001 | Leonard | 360/51 |
| 6,421,200 B2 | 7/2002 | Takaishi | |
| 6,714,369 B2 * | 3/2004 | Miles | 360/51 |
| 6,775,083 B2 * | 8/2004 | Hilla et al. | 360/51 |
| 6,882,497 B2 | 4/2005 | Min et al. | |
| 7,016,140 B1 * | 3/2006 | Schultz et al. | 360/75 |
| 2002/0196571 A1 * | 12/2002 | Hilla et al. | 360/51 |

OTHER PUBLICATIONS

Takaishi et al., "Hard Disk Drive Servo Technology for Media-Level Servo Track Writing," IEEE Transactions on Magnetics, Mar. 2003, pp. 851-856, vol. 39, No. 2.

* cited by examiner

*Primary Examiner*—Wayne R Young
*Assistant Examiner*—Dismery Mercedes
(74) *Attorney, Agent, or Firm*—Dinsmore & Shohl LLP (57) ABSTRACT

A clock tracking circuit and method uses a clock compensation signal to compensate for timing marks on a media disk. The clock compensation signal may compensate for at least one of improper clock track closure and written-in jitter of the timing marks used to produce the measured clock signal. The clock compensation signal may be used to control a controllable oscillator used to generate the clock signal that thereby provides a compensated clock signal.

17 Claims, 9 Drawing Sheets

DISK DRIVE CLOCK TRACKING CIRCUIT, ERROR COMPENSATION CIRCUIT AND METHOD

CROSS-REFERENCE TO RELATED APPLICATIONS

This application claims benefits from U.S. Provisional Patent Application No. 60/667,081 filed Apr. 1, 2005, the contents of which are hereby incorporated herein by reference.

FIELD OF THE INVENTION

The present invention relates generally to computer devices, and more particularly to a clock tracking circuit for use in a disk drive servo controller and related methods.

BACKGROUND OF THE INVENTION

Data on modern computer disks is stored along circular tracks that are written and read by servo controlled, magnetic read/write heads. In order to allow for precise guidance of the read/write heads, disks are further coded with guide tracks. Typically, such guide tracks encode clock signals at defined intervals, and are placed on the disk surface during the manufacturing process. In order to allow for uniform guidance, clock signals are evenly spaced in the clock track. Even spacing can be assured by producing a clock signal at controlled, even, intervals. However, unless the period of rotation is an integer multiple of the nominal interval between two clock signals, the distance between the last clock signal and the first clock signal on the track will not be equal. Such a clock track is said not to be "closed", and causes jitter in any clock recovered from the track.

To ensure precise tracking, each time a clock track is written on a disk, clock track closure is ensured. To accomplish this, a clock track is currently re-written as many times as necessary to guarantee satisfactory clock track closure. This may be time-consuming and increases manufacturing throughput time.

Additionally, even once clock track closure is achieved, a clock track typically continues to include written-in jitter. Written-in jitter results in phase-in error of propagated servo-patterns. This in turn affects the quality (linearity) of the position error signal.

Written-in jitter is particularly acute, when media level servo track writers (MLSTW) are used in the production of disks. Currently, a clock track is written on a reference disk that is used each time a new set of disks is loaded on the MLSTW. When the reference disk is loaded on MLSTW, the offset of the disk will be different from the offset when the disk was written, and therefore the center of the written clock track on the disks will change. This will result in repeatable jitter of the read-back clock signal on the produced disks. This repeatable jitter has to be compensated to ensure precise propagation of the servo patterns on the blank disks.

Accordingly, there is a need for a clock tracking circuit that may more effectively compensate for various types of clock jitter, including jitter attributable to incorrect clock track closure, and written-in jitter.

SUMMARY OF THE INVENTION

This invention proposes a method which can compensate the clock track closure without need for repetitive writing of the clock track. The method may also be used to compensate for written-in jitter of the clock track, hence significantly improving the quality of the position error signal and tracking.

Conveniently, the proposed method can be also be used to compensate repeatable jitter when a separate reference disk, with prewritten clock track, is used in MLSTWs. The same method used for compensation of written-in jitter can be used to compensate this repeatable jitter.

In accordance with an embodiment of the present invention, a clock compensation signal is injected in a clock tracking circuit to compensate for at least one of improper clock track closure and written-in jitter of said timing marks on a clock signals.

In accordance with an aspect of the present invention, there is provided a method of generating a compensated clock signal from a clock track on a disk. The clock track includes a plurality of timing marks. The method includes reading the timing marks from the clock track on the disk; producing a raw clock signal as a result; forming a difference between the raw clock signal and the compensated clock signal; adding a clock compensation signal to the difference to form a compensated error signal; and controlling an oscillator using the compensated error signal to generate said compensated clock signal.

In accordance with another aspect of the present invention, a method of writing a clock track to media disks is provided. The method includes loading the media disks in a media level servo track writer; loading a reference clock disk containing timing marks on a clock track in the media level servo track writer; reading the timing marks from the clock track on the reference clock disk; producing a raw clock signal as a result; forming a difference between the raw clock signal and a compensated clock signal; adding a clock compensation signal to the difference to form said compensated error signal; controlling an oscillator using the compensated error signal to generate the compensated clock signal; and writing a clock track using said compensated clock signal to each of the plurality of disks.

In accordance with yet another aspect of the present invention there is provided a clock tracking circuit, for forming a reference clock from timing marks in a clock track on a media disk. The tracking circuit includes a phase detector to determine a phase difference between a measured clock signal and a generated clock signal; an adder, receiving a signal derived from the phase difference and a clock compensation signal; a clock compensation signal generator to generate the clock compensation signal for each of the timing marks; and a controllable oscillator, controlled by an output of the adder to generate the compensated clock signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
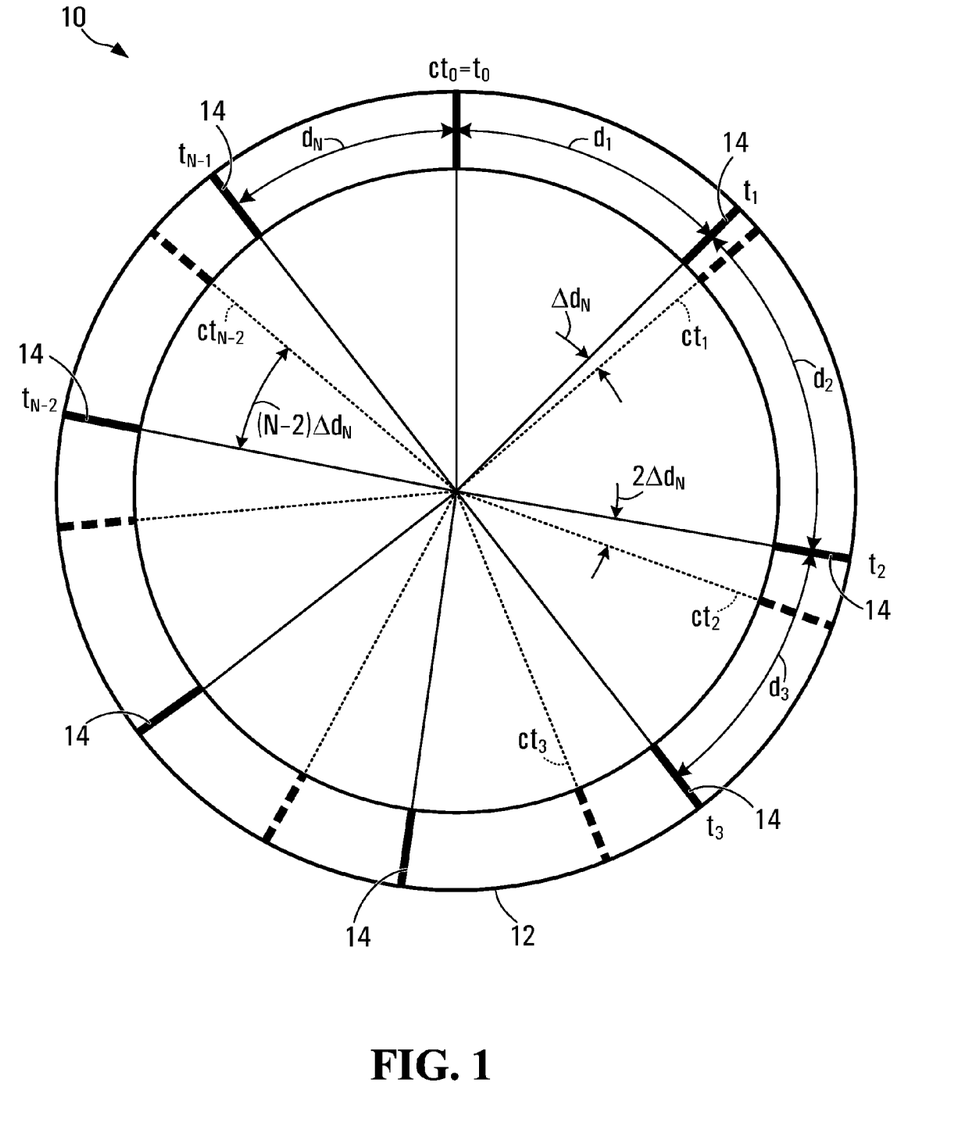
FIG. 1 is a schematic diagram of computer disk surface, including various clock timing marks.

FIG. 1 schematically illustrates a disk surface 10, including a clock track 12. Clock track 12, has coded therein timing marks 14, used to generate a reference clock signal having a frequency $f_c$. Timing marks 14 are written at periodic intervals of $1/f_c$, and are thus evenly spaced.

The number of timing marks N written on track 12 in one revolution is $$N = T_s f_c \quad (1)$$

where $T_s$ is the period of spindle motor rotation and $f_c$ is the frequency of the reference clock signal used to write the clock track.

The nominal distance $d_i$ between two adjacent timing marks $t_i$ and $t_{i-1}$ is $$d_i = \omega_i / f_c \quad (2)$$

where $\omega_i$ is the angular rotating speed while writing the corresponding timing mark $t_i$. If $t_{N-1}$ is the last timing mark and $t_0$ is the first timing mark then the angular distance between these two marks represents the clock closure $d_N$, and is given by $$d_N = 2\pi - \sum_{i=1}^{N-1} d_i \quad (3)$$

If the period of rotation is not an integer multiple of the nominal interval between two clock signals, the angular distance between the last timing mark $t_{N-1}$ and the first timing mark $t_0$ will not be the same as the nominal distance between the remaining timing marks ($t_i$ and $t_{i-1}$) and will, in fact, be shorter.

Figure 2:
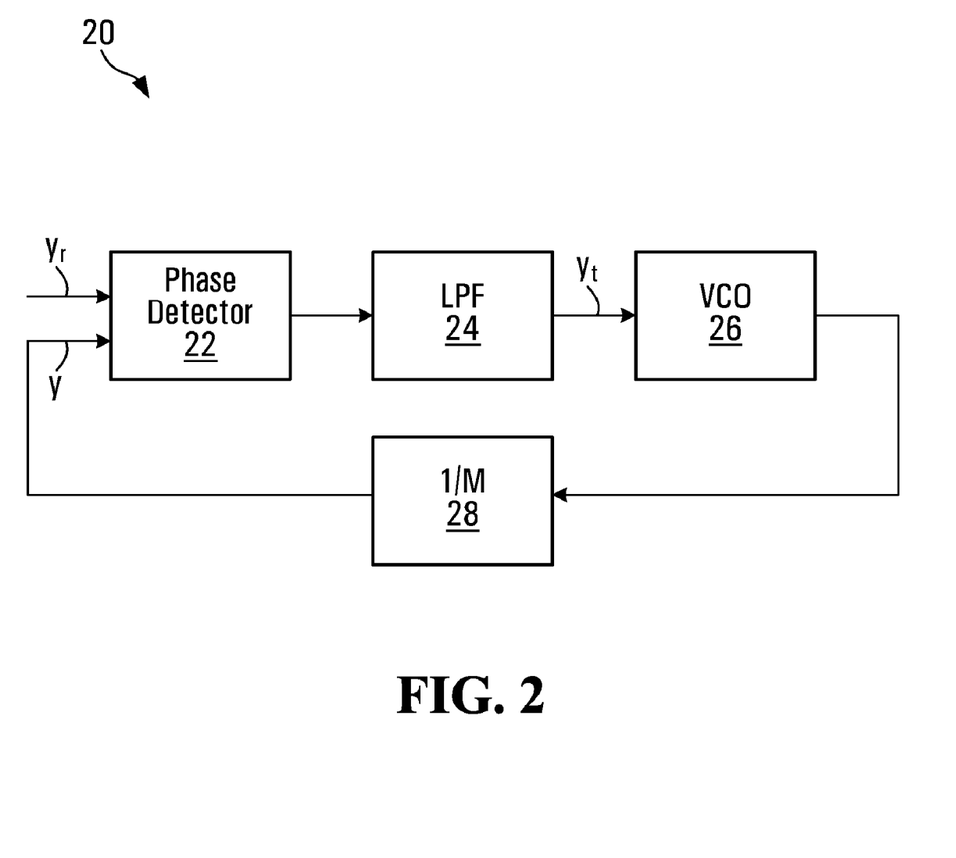
FIG. 2 is a schematic of a conventional phase-locked-loop controller used to track a clock track of a media disk.

Typically, the clock signal is tracked using a conventional phase-locked-loop 20 illustrated in FIG. 2. As illustrated, phase locked loop 20 includes a phase detector 22 and a voltage controlled oscillator (VCO) 26. A divider 28 frequency scales (i.e. divides) the output of VCO 26. Phase detector 22 produces an error signal proportional to the phase difference between the reference clock signal $y_r$ and the divided form of the output of VCO 26. The error signal is filtered by a low pass filter 24 to provide a control signal $y_t$ used to control the frequency of VCO 26. In operation, PLL 20 strives to reduce the filtered error signal $y_t$, and thus will ultimately track the reference clock signal $y_r$. Phase locked loops are discussed generally in Dan Wolaver, Phase-Locked Loop Circuit Design (Prentice Hall Advanced Reference Series, 1991).

Figure 3A:
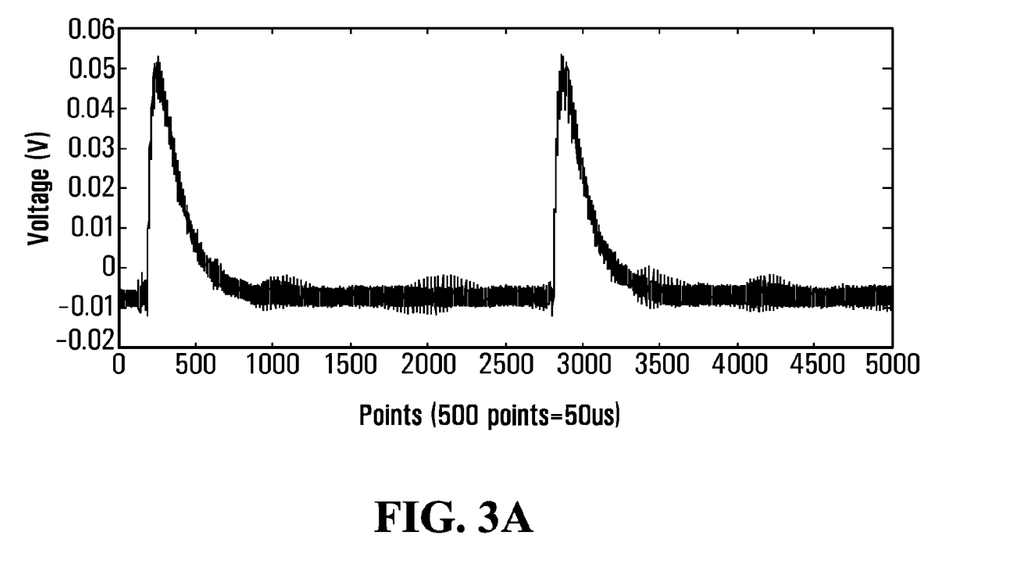
FIG. 3A illustrates a clock tracking error signal, including error attributable to a clock track that is not closed.
Figure 3B:
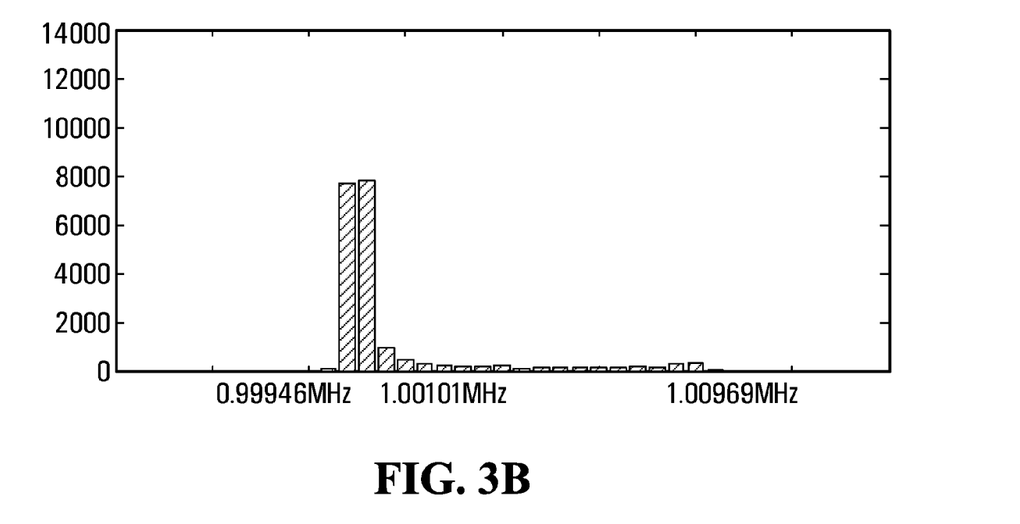
FIG. 3B is a histogram of the clock output in the presence of the error signal of FIG. 3A.

Now, incorrect closure of $d_N$ will disturb the operation of conventional PLL 20 when tracking the clock signal as, for example, illustrated by measured results shown in FIG. 3A. In these results the clock closure error is about 10%. The measured disturbance in input $y_t$ to VCO 26 caused by the incorrect closure is illustrated. This, in turn results in frequency jitter in the divided output of the VCO 26, y, as illustrated in the frequency histogram of FIG. 3B.

As noted, currently correct closure $d_N$ is obtained by repeatedly re-writing the clock track until the closure period $T_N$ meets specified requirement (typically, closure period must be $T_N=(1/f_c)+/-0.1\%$).

Figure 4:
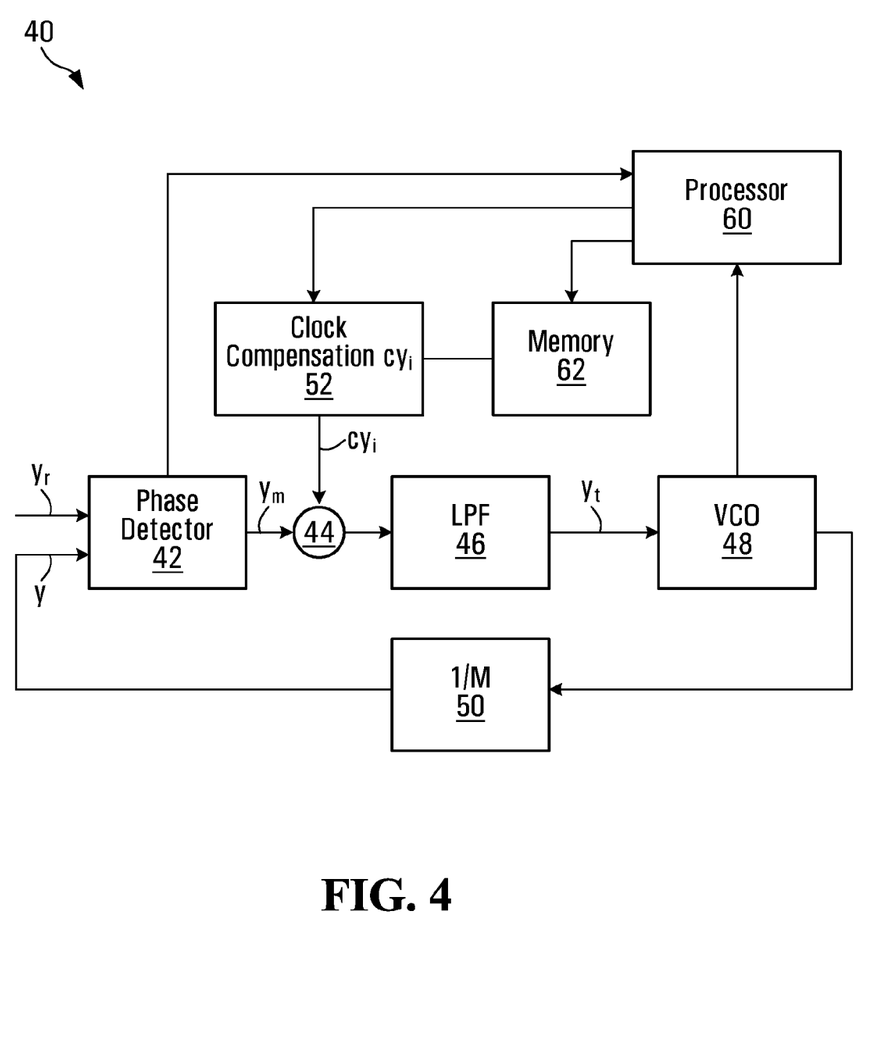
FIG. 4 is a schematic of a controller used to track a clock track of a computer disk, exemplary of an embodiment of the present invention.

FIG. 4 accordingly illustrates a clock tracking circuit 40, in the form of a PLL, exemplary of an embodiment of the present invention. Clock tracking circuit 40 includes a phase detector 42, a summing block (summer) 44, a clock compensation signal generator 52, a low pass filter 46, a VCO 48, and a 1/M frequency divider 50. A processor 60 is in communication with VCO 48, and processor memory 62. Processor 60 may take the form of a microcontroller, microprocessor, or the like. Memory 62 may store values assessed by processor 60, and instructions causing clock tracking circuit 40 to function in manners exemplary of embodiments of the present invention.

In one exemplary of embodiment of the present invention, incorrect closure $d_N$ may be compensated using a compensation signal $cy_i$ injected at summer 44 as shown in FIG. 4.

In order to form $cy_i$, the incorrect closure $d_N$ may be measured and stored, using processor 60. Specifically, the disk read/write head may, for example, read the written timing marks $t_i$ from the disk media and use the read signal as a reference clock signal $y_r$ for PLL circuit in FIG. 2. Now, the frequency of the nominal reference clock signal may be determined by processor 60 as $f_c$, the period of rotation ($T_s$) may be measured, and the number N of written timing marks $t_i$ may be calculated as the integer ($T_s f_c$). Once N is known, the charge pump of PLL (not specifically illustrated) may be used to measure $d_N$, to calculate $\Delta d_N = d_N/(N-2)$. $\Delta d_N$ may then be stored in processor memory 62, for later use.

Now using $\Delta d_N$, a compensation signal $cy_i$ may be generated by clock compensation generator 52, for each timing mark $t_i$. The compensation signal for the $i^{th}$ timing mark takes the form, $$cy_i = i\Delta d_N \quad (4)$$

where $\Delta d_N$ is, $$\Delta d_N = \frac{d_N}{N-2} \quad (5)$$

This compensation signal effectively shifts the angular position of each timing mark $t_i$ by an angle $i\Delta d_N$. The compensation signal $cy_i$ for each timing mark may alternately be generated by processor 60 and stored in memory 62, removing any need for generator 52 to form $cy_i$ from $\Delta d_N$.

Hence, the position of compensated timing marks will be $$ct_i = t_i + cy_i = t_i + i\frac{d_N}{N-2} \quad (6)$$

As a result, the incorrect closure $d_N$ may be eliminated by redistribution of the closure distance $d_N$ among all other timing marks. The compensated timing marks are shown as $ct_i$ in FIG. 1.

Compensated timing marks $ct_i$ may be written to track 12, in place of timing marks $t_i$. Such a disk may later be used as a reference clock disk in an MLSTW (as described below), or in a disk drive used to store data. Alternatively, clock tracking circuit 40 may be used to generate a compensated reference clock, y, taken at the output of frequency divider 50.

Figure 5A:
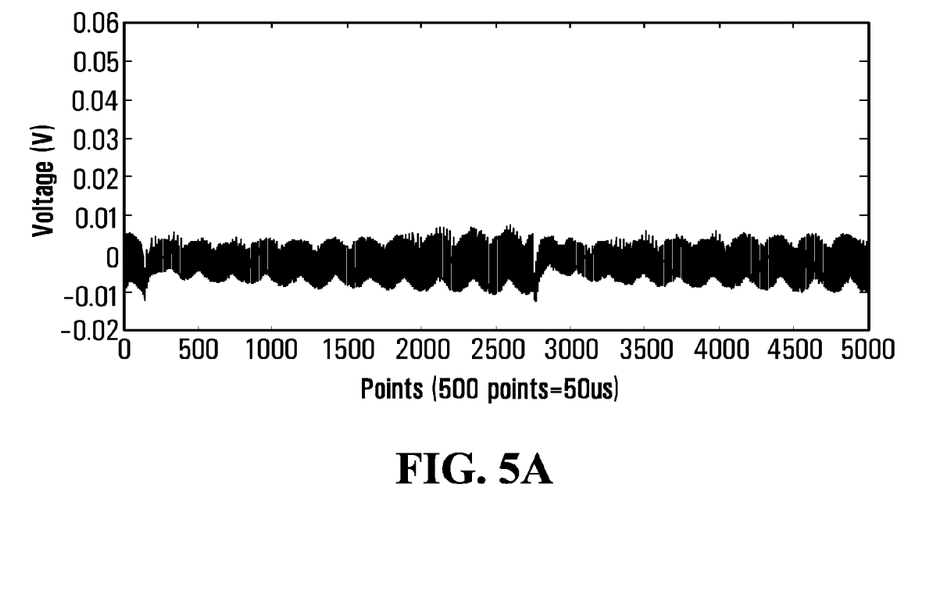
FIG. 5A illustrates a clock tracking error signal, including a clock error compensation signal, provided in manners exemplary of an embodiment of the present invention.
Figure 5B:
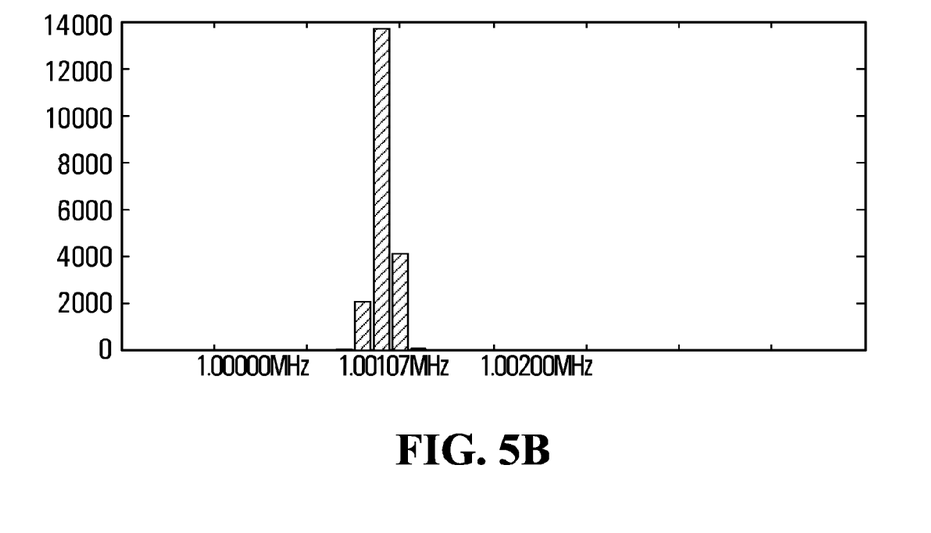
FIG. 5B is a histogram of the clock output in the presence of the error signal of FIG. 5A.

FIG. 5A shows the compensated error signal $y_t$ to VCO 48, after the injection of the compensation signal $cy_i$. As illustrated, the transient disturbance caused by incorrect closure is effectively eliminated. FIG. 5B shows measured frequency histogram of the compensated reference clock, taken from the divided output of the VCO, y. As compared to FIG. 3B, the frequency jitter is significantly reduced.

Conveniently, once the closure of the clock track has been compensated, written-in (repeatable) jitter of the clock track may optionally also be compensated, by clock compensation circuit 52.

Specifically, if the rotational speed during writing of the clock track is constant then the distance between any two adjacent timing marks will be constant and equal to d given by $$d = \frac{l}{N} \quad (7)$$

where l is circumferential length of the clock track and N is total number of timing marks written on the track.

This will result in near zero jitter of the clock track. However, due to the variation of the speed of the spindle motor during writing of the clock track, the distance between two adjacent timing marks will vary which results in written-in (repeatable) jitter of the clock track.

Figure 6:
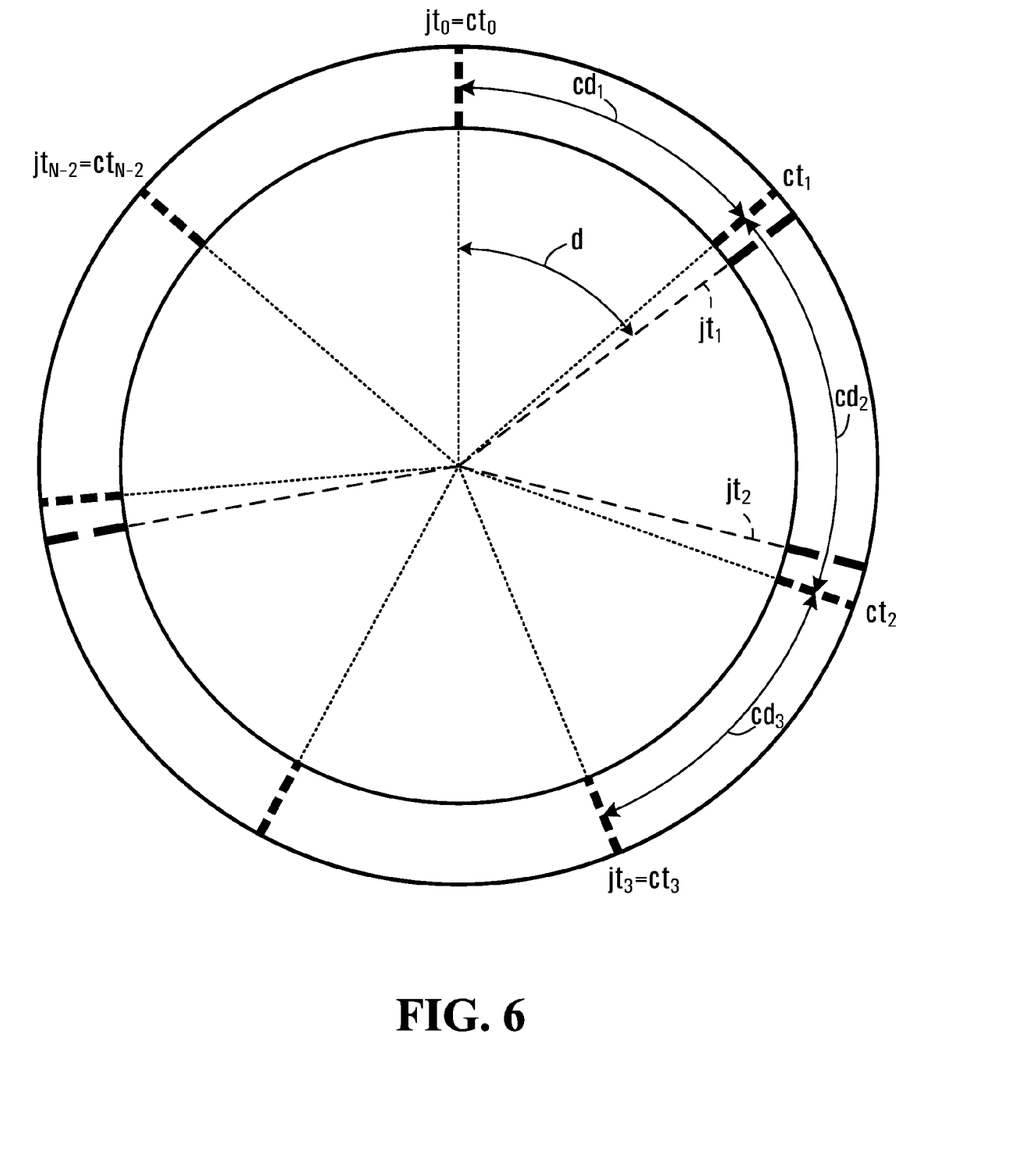
FIG. 6 is a schematic diagram of computer disk surface, including various clock timing marks that include written-in jitter.

FIG. 6 accordingly illustrates unequal distribution of the timing marks $ct_0$, $ct_1$, $ct_2$, ... caused by the jitter. If the value of correct distance between two timing marks is d, and if $cd_i = ct_i - ct_{i-1}$ is a distance between two adjacent marks, then the position of the corrected timing mark $jt_i = i \cdot d$ (i=1 ... N-1) can be found by shifting the timing mark $ct_i$ by distance $\Delta cd_i = (ct_i - jt_i)$.

Figure 7:
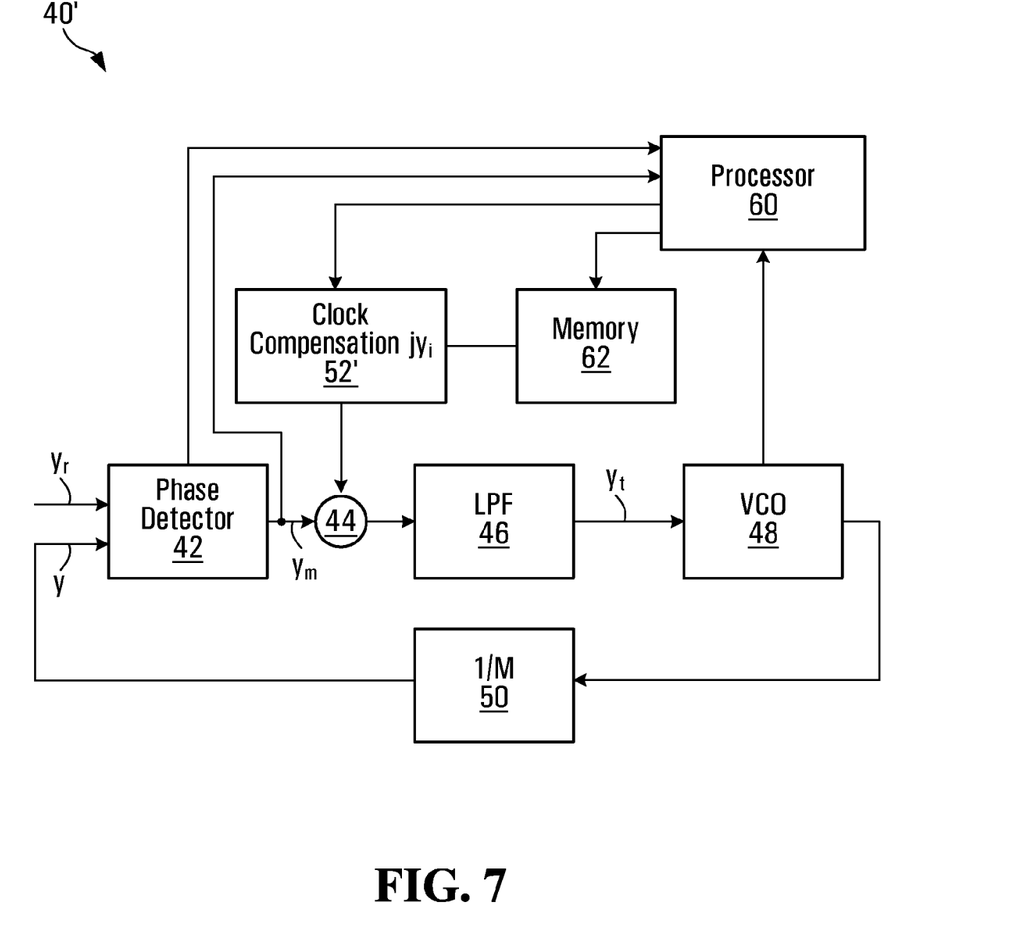
FIG. 7 is a schematic of a controller used to track a clock track of a computer disk, exemplary of an embodiment of the present invention.

Therefore, if the value of required compensation for each timing mark can be found, the written-in (repeatable) jitter can be compensated, and injected at summer 44, in much the same way as $cy_i$ is injected. FIG. 7 accordingly illustrates a modified tracking circuit 40', in the form of a PLL. Tracking circuit 40', like tracking circuit 40 of FIG. 4, includes a phase detector 42, a summer 44, a low pass filter 46, and a VCO 48, processor 60, and processor memory 62.

When tracking circuit 40 (FIG. 4) is synchronized, the output y of VCO 48, divided by divider 50 follows the reference clock signal $y_r$ that is read-back from the disk. Now, the read-back reference clock signal $y_r$ contains both written-in (repeatable) jitter and non-repeatable jitter. As noted, written-in (repeatable) jitter is caused by jitter that was introduced into the track during the writing process of the clock track. Non-repeatable jitter is mainly caused by the variation of the spindle motor speed during the reading process of the written clock track. Tracking circuit 40' will follow both written-in (repeatable) and non-repeatable jitter of the clock track.

Therefore, the reference clock signal, $y_r$, generated from the clock track, can be represented as a sum of a jitter-free clock signal $y_f$, a written-in (repeatable) jitter signal $RRO(y_r)$, and a non-repeatable jitter signal $NRRO(y_r)$:

$$y_r = y_f + NRRO(y_r) + RRO(y_r) \quad (8)$$

Now, written-in (repeatable) jitter $RRO(y_r)$, may be found by measuring signal $y_m$ proportional to this jitter at the output of phase detector 42 as shown in FIG. 7. Then, repeatable part $RRO(y_m)$ of the measured signal $y_m$ may be found by synchronous averaging of $y_m$.

Specifically, the relationship between the clock signal $y_r$ and the measured signal $y_m$ may be given by, $$y_r = (1+PC)y_m \quad (9)$$

where C is the transfer function of the low pass filter 46 and P is the transfer function of the voltage-controlled oscillator (VCO).

Hence, the written-in (repeatable) jitter $RRO(y_r)$ of the clock track may be found as $$RRO(y_r) = (1+PC)RRO(y_m) \quad (10)$$

After substituting $y_f(i) = jt_i = i \cdot d$, $RRO(y_r(i)) = \Delta cd_i$, for i=1 ... N-1, into equation (8) and (9), $$y_r(i) = i \cdot d + \Delta cd_i + NRRO(y_r(i)) \quad (11)$$

$$y_m(i) = \frac{1}{1+PC}[y_r(i) - i \cdot d] \quad (12)$$
$$= \frac{1}{1+PC}[\Delta cd_i + NRRO(y_r(i))]$$

$$RRO(y_m(i)) = \frac{1}{W}\sum_{w=1}^{W} y_m(i, w) \quad (13)$$
$$= \frac{1}{1+PC}\left[\Delta cd_i + \frac{1}{W}\sum_{w=1}^{W} NRRO(y_r(i))\right]$$
$$= \frac{1}{1+PC}(\Delta cd_i)$$

where $y_m(i,w)$ is measured signal corresponding to the $ct_i$-th timing mark at the w-th revolution and is sampled during W revolutions.

Then compensation signal $jy_i$ may be formed by measuring $y_m(i,w)$ for W revolutions. Processor 60 may then calculate $jy_i$, for each timing mark $t_i$. The calculated compensation signal $jy_i$ may then be stored in memory for later use by clock compensation circuit 52' and injected at summer 44, as illustrated in FIG. 7.

$$jy_i = RRO(y_r(i)) \quad (14)$$
$$= \Delta cd_i$$
$$= (1 + PC)RRO(y_m(i))$$
$$= (1 + PC)\frac{1}{W}\sum_{w=1}^{W} y_m(i, w)$$

The overall transfer function of the system when the compensation signal $jy_i$ is injected is given, $$y = \frac{PC}{1+PC} y_r - \frac{PC}{1+PC} jy_i \quad (15)$$

where y is divided output from VCO 48.

If $jy_i = RRO(y_r)$, then equation (15) becomes, $$y = \frac{PC}{1+PC}(y_f + NRRO(y_r) + RRO(y_r)) - \frac{PC}{1+PC} RRO(y_r) \quad (16)$$

$$= \frac{PC}{1+PC}(y_f + NRRO(y_r))$$

As shown by equation (16), after compensation, the written-in (repeatable) jitter of the clock track will be cancelled out and VCO 48 will follow only the non-repeatable jitter caused mainly by spindle motor speed variation.

Consequently, the divided output of VCO 48, y, will not contain any written-in (repeatable) jitter and can be used as a reference to propagate jitter-free clock track on the disk.

As will now be appreciated, as repeatable written in jitter and jitter resulting from incomplete track closure are additive, compensation circuits 52 and 52' may be combined, and values $cy_i$ and $jy_i$ may be stored in memory 62, and injected as components by a single compensation circuit 52 or 52'.

During experimental tests written-in (repeatable) jitter of +/−0.2% was introduced into 1 MHz signal.

Figure 8A:
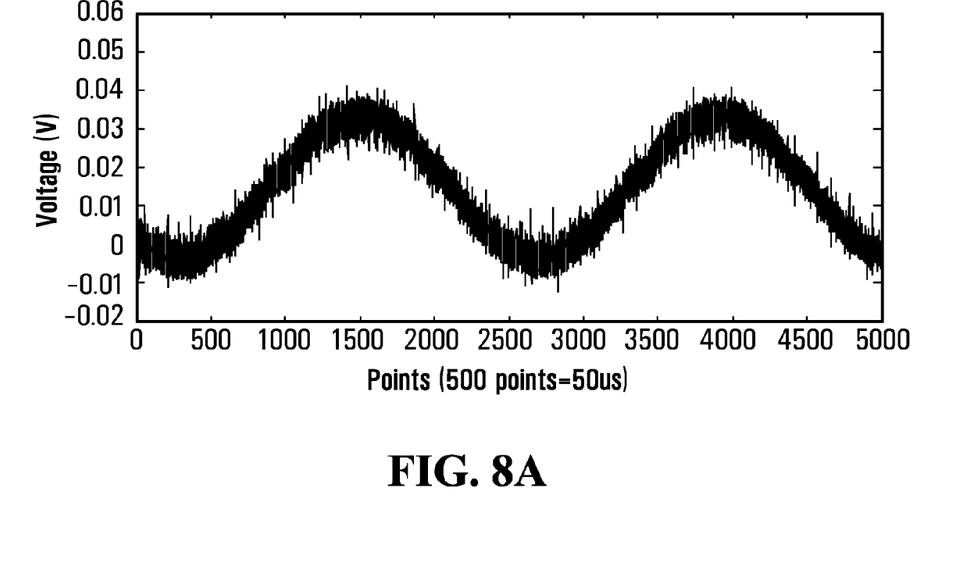
FIG. 8A illustrates a clock tracking error signal, including error attributable to written-in error.
Figure 8B:
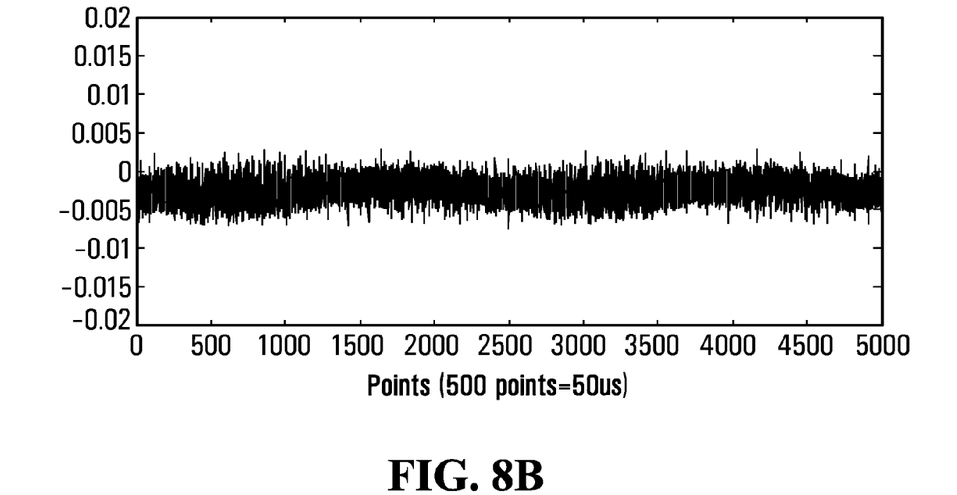
FIG. 8B illustrates a clock tracking error signal, including a clock error compensation signal, provided in manners exemplary of an embodiment of the present invention.

FIG. 8A illustrates the measured filtered error signal (VCO input signal $y_t$) before the compensation. Effect of written-in (repeatable) jitter is clearly visible, and since this signal represents input to VCO 48, it will cause repeatable jitter of VCO output. FIG. 8B illustrates measured input signal $y_t$ to VCO 48 after the compensation. The effect of written-in (repeatable) jitter is cancelled and PLL follows only the non-repeatable jitter.

Figure 9A:
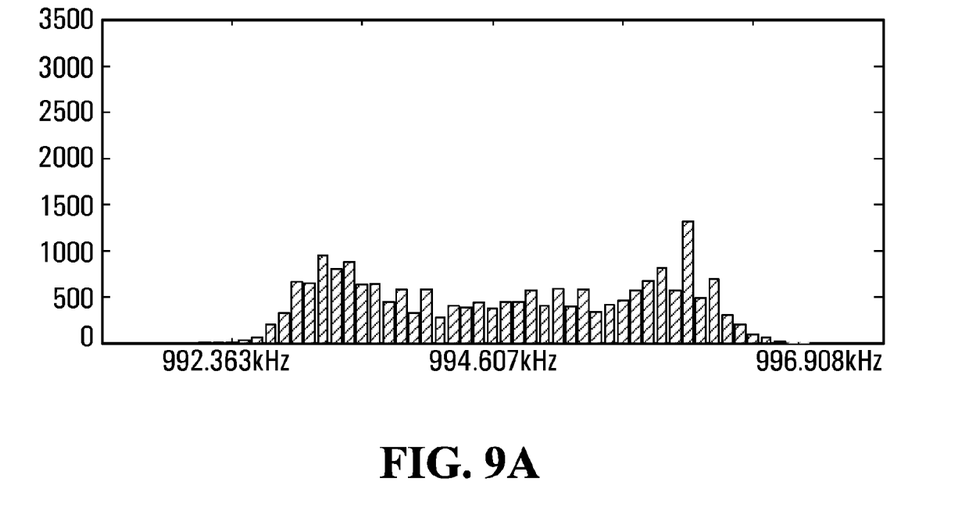
FIG. 9A is a histogram of the clock output in the presence of the error signal of FIG. 8A.
Figure 9B:
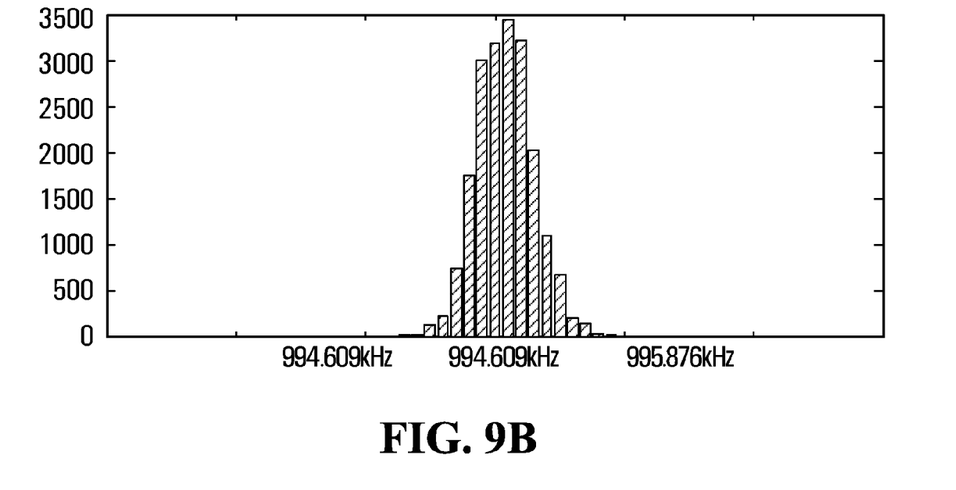
FIG. 9B is a histogram of the clock output in the presence of the error signal of FIG. 9B.

FIG. 9A shows frequency histogram of the divided VCO output y before written-in (repeatable) jitter compensation and FIG. 9B after the compensation. Clearly, the written-in (repeatable) jitter was eliminated.

Using tracking circuits 40 and 40' and associated methods, a clock track with good closure and minimum written-in error can be propagated on the disk.

Specifically, a clock track is written to a reference clock disk. The reference clock disk is subsequently used in MLSTW for the generation of the reference clock signal. When the reference clock disk is loaded on MLSTW each time a new set of blank disk is loaded, the offset of the reference clock disk will be different from the offset when the reference clock disk was written, and therefore the center of the written clock track will change. This will result in repeatable jitter of the read-back clock signal, as described above. This repeatable jitter may be compensated using tracking circuit 40' and the associated method to ensure precise propagation of the servo patterns on the blank disks. This repeatable jitter is somewhat different from the written-in (repeatable) jitter described above, due to the variation of the speed of the spindle motor during writing of the clock track. The written-in (repeatable) jitter caused by the variation of the speed of the spindle motor when writing the clock track on the reference clock disk is already compensated during the writing process of the reference clock disk.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of generating a compensated clock signal from a clock track on a disk, said clock track having a plurality of N timing marks, said method comprising:
   reading said timing marks from said clock track on said disk;
   producing a raw clock signal as a result of said reading;
   forming a difference between said raw clock signal and said compensated clock signal;
   adding a clock compensation signal to said difference to form a compensated error signal;
   controlling an oscillator using said compensated error signal to generate said compensated clock signal;
   wherein said clock compensation signal includes a component $i\Delta d_N$, corresponding to the $i^{th}$ of said timing marks, wherein $$\Delta d_N = \frac{d_N}{N-2},$$

wherein $d_N$ is the distance between the last of said plurality of timing marks and the $1^{st}$ of said plurality of timing marks, wherein $i=0$ corresponds to the $1^{st}$ of said plurality of timing marks and $i=N-1$ corresponds to the last of said plurality of timing marks.

2. The method of claim 1, wherein said clock compensation signal further compensates for written-in jitter of said timing marks.

3. The method of claim 2, further comprising frequency dividing an output of said oscillator to form said compensated clock signal.

4. The method of claim 2, further comprising writing said compensated clock signal to said disk, for each of said timing marks.

5. The method of claim 1, further comprising determining said clock compensation signal for each of said timing marks.

6. The method of claim 5, where said determining said clock compensation signal, comprises measuring dN, the distance between the last of said timing marks and the $1^{st}$ of said timing marks, and calculating therefrom $\Delta dN = dN/N-2$ and $i\Delta dN$.

7. The method of claim 5, where said determining said clock compensation signal, comprises measuring an error in the read position of each of said timing mark, for W rotations.

8. A method of writing a clock track to a plurality of media disks, comprising
   loading said plurality of media disks in a media level servo track writer;
   loading a reference clock disk containing a plurality of timing marks on a clock track in said media level servo track writer;
   reading said timing marks from said clock track on said reference clock disk;
   producing a raw clock signal from of said reading;
   forming a difference between said raw clock signal and a compensated clock signal;
   adding a clock compensation signal to said difference to form a compensated error signal;
   controlling an oscillator using said compensated error signal to generate said compensated clock signal;

writing a clock track using said compensated clock signal to each of said plurality of disks.

9. A clock tracking circuit, for forming a reference clock from timing marks in a clock track on a media disk, said tracking circuit comprising:
a phase detector to determine a phase difference between a measured clock signal generated from said clock track and a compensated clock signal;
a summer, receiving a signal derived from said phase difference and a clock compensation signal;
a clock compensation signal generator to generate said clock compensation signal for each of said timing marks;
a controllable oscillator, controlled by an output of said summer to generate said compensated clock signal;
wherein said clock compensation signal includes a component $i\Delta d_N$, corresponding to the $i^{th}$ of said timing marks, wherein, $$\Delta d_N = \frac{d_N}{N-2},$$

wherein $d_N$ is the distance between the last of said plurality of timing marks and the $1^{st}$ of said plurality of timing marks, wherein i=0 corresponds to the $1^{st}$ of said plurality of timing marks and i=N−1 corresponds to the last of said plurality of timing marks.

10. The clock tracking circuit of claim 9, further comprising a filter for filtering said phase difference to form said signal derived from said phase difference.

11. The clock tracking circuit of claim 10, further comprising a frequency divider for frequency dividing an output of said controllable oscillator to generate said compensated clock signal.

12. The clock tracking circuit of claim 11, further comprising memory storing data to form said clock compensation signal for each of said timing marks.

13. The clock tracking circuit of claim 12, wherein said clock compensation signal for each of said timing marks compensates for at least one of improper clock track closure and written-in jitter of said timing marks.

14. The clock tracking circuit of claim 13, further comprising a processor in communication with said memory to calculate and store said data.

15. The clock tracking circuit of claim 14, wherein said memory further comprises processor executable instructions, adapting said processor to determine said clock compensation signal by measuring an error in the read position of each of said timing marks, for W rotations of said disk.

16. A method of generating a compensated clock signal from a clock track on a disk, said clock track having a plurality of timing marks, said method comprising:
reading said timing marks from said clock track on said disk;
producing a raw clock signal as a result of said reading;
forming a difference between said raw clock signal and said compensated clock signal;
adding a clock compensation signal to said difference to form a compensated error signal;
controlling an oscillator using said compensated error signal to generate said compensated clock signal;
writing said compensated clock signal to said disk, for each of said timing marks.

17. A method of generating a compensated clock signal from a clock track on a disk, said clock track having a plurality of timing marks, said method comprising:
measuring an error in the read position of each of said timing marks, for W rotations, to determine a read position error for each of said plurality of timing marks;
storing said read position error for each of said plurality of timing marks;
reading said timing marks from said clock track on said disk;
producing a raw clock signal as a result of said reading;
forming a difference between said raw clock signal and said compensated clock signal;
adding a clock compensation signal including a component derived from said read position error for each of said plurality timing marks to form a compensated error signal;
controlling an oscillator using said compensated error signal to generate said compensated clock signal.

* * * * *

UNITED STATES PATENT AND TRADEMARK OFFICE
CERTIFICATE OF CORRECTION

PATENT NO. : 7,502,186 B2  Page 1 of 1
APPLICATION NO. : 11/278308
DATED : March 10, 2009
INVENTOR(S) : Zhang et al.

It is certified that error appears in the above-identified patent and that said Letters Patent is hereby corrected as shown below:

Col. 8, line 50 "mark" should read --marks--.

Signed and Sealed this

Fourth Day of August, 2009

JOHN DOLL
*Acting Director of the United States Patent and Trademark Office*